United States Patent [19]

Golben et al.

[11] Patent Number: 5,250,368
[45] Date of Patent: Oct. 5, 1993

[54] EXTENDED CYCLE-LIFE METAL HYDRIDE BATTERY FOR ELECTRIC VEHICLES

[75] Inventors: P. Mark Golben, Florida, N.Y.; Timothy D. Meyer, Wyckoff, N.J.

[73] Assignee: Ergenics, Inc., Ringwood, N.J.

[21] Appl. No.: 978,815

[22] Filed: Nov. 19, 1992

[51] Int. Cl.$^5$ .............................................. H01M 8/06
[52] U.S. Cl. ........................................ 429/17; 429/19; 429/21; 429/101
[58] Field of Search ............... 429/13, 17, 19, 20, 429/21, 26, 34, 101, 50, 40, 38, 39, 120, 27

[56] References Cited

U.S. PATENT DOCUMENTS

| | | | |
|---|---|---|---|
| 3,520,728 | 7/1970 | Beccu | 429/101 X |
| 3,850,694 | 11/1974 | Dunlop et al. | 429/21 |
| 4,343,868 | 8/1982 | Putt | 429/17 |
| 4,692,390 | 9/1987 | Roy | 429/17 |
| 4,699,856 | 10/1987 | Heuts et al. | 429/218 |
| 5,047,301 | 9/1991 | Adlhart et al. | 429/101 |
| 5,071,720 | 12/1991 | Notten | 429/101 |

Primary Examiner—Anthony Skapars
Attorney, Agent, or Firm—Kinzer, Plyer, Dorn, McEachran & Jambor

[57] ABSTRACT

A metal hydride battery includes a metal hydride vessel for storing hydrogen and a battery cell in another enclosure having the capability of fluid communication between the vessel and enclosure through in-line piping. The in-line piping includes a catalytic converter and a molecular sieve dryer for adsorbing water from the hydrogen being piped from the battery cell enclosure to the hydrogen storage metal hydride vessel.

8 Claims, 1 Drawing Sheet

EXTENDED CYCLE-LIFE METAL HYDRIDE BATTERY FOR ELECTRIC VEHICLES

BACKGROUND OF THE INVENTION

1. Field of the Invention

The present invention relates generally to a metal hydride battery and more specifically relates to increasing the cycle life of a metal hydride battery by improving the battery hydrogen storage capability.

12. Background Art

Metal hydride batteries have been used in wide-ranging applications where a reliable, self-contained source of electric power is needed in a location which is generally inaccessible. U.S. Pat. No. 5,047,301, assigned to a subsidiary company of the assignee of the present invention, is drawn to a high temperature battery utilizing a connection between the battery and the source of hydrogen. That battery only begins operation when it is exposed to the hydrogen gas which passes through piping after the connection between the battery and the hydrogen source is made. The battery disclosed in U.S. Pat. No. 5,047,301 operates only so long as there is hydrogen being discharged from the hydrogen source, and stops operating when the flow of hydrogen either is discontinued or the hydrogen is depleted. This type of battery performs well in conditions where battery operation is necessarily automatic, such as in space or in a deep well environment, where manual intervention or monitoring is difficult, at best, and continued electrical power over long periods of time is not necessary.

These types of devices are further limited during use by the operation of the hydride battery, which is depleted of its electrical generating capacity as the hydrogen is absorbed within the cells of the battery. That is, when the battery cells absorb the available hydrogen to capacity or near to capacity, use of the battery no longer becomes possible without recharging of the battery cells by removal of the hydrogen.

Hydride batteries which are capable of regeneration have been described and used. Of particular significance in the hydrogen battery field, was the development of nickel-hydrogen (Ni—H$_2$) systems on which extensive study has been performed.

A nickel hydrogen cell is disclosed in U.S. Pat. No. 3,850,694, utilizing a reversible electrolytic reaction wherein Ni(OH)$_2$ and OH$^-$ are converted to NiOOH, H$_2$0 and an electron. Reference to U.S. Pat. No. 3,850,694 is made for teaching of the electrochecmical process occurring in these types of batteries, and the subject matter of that patent is incorporated herein by reference. Because of the high initial cost of manufacture, implementation of Ni—H$_2$ battery systems has not been cost-efficient except for certain esoteric uses, such as a power source in space.

Development of the Ni—H$_2$ battery systems for terrestrial uses has been a subject of study by government agencies and private concerns. The search for an efficient and less costly alternative electrical battery has become more significant in recent times with the advent of electrical battery-powered automobiles. A clean source of power for automotive systems, such as electric power, is increasingly important in today's environment to avoid the resulting pollution, both noise and emission, which ensues from use of conventional gasoline combustion engines.

A major consideration of terrestrial use of hydride batteries is the costly initial funding of the materials needed to manufacture the battery and the need to charge and discharge the battery through a great number of cycles without succumbing to any appreciable loss of storage capacity or available potential and power.

As the hydride battery cycles through a discharge and recharge cycle, an appreciable amount of deterioration of the elements occurs. This deterioration is permanent and results from irreversible chemical processes within the storage and battery system. After repeated cycles, that deterioration is cumulative and results in failure of the system, requiring the complete replacement of the hydrogen storage unit, of the battery or of both. Replacement of these elements is an expensive proposition and consequently, preventing or postponing the deterioration of the elements in the system greatly prolongs battery cell operation without the need to expend excessive sums in replacing the deteriorated elements. The savings achieved in prolonged trouble-free operation are sufficient to provide a cost-effective utilization of hydride batteries in terrestrial applications, such as for providing a locomotive force in automobiles, which can more effectively compete on a total cost basis with conventional fuel systems such as internal combustion engines.

It has been found that the number of cycles in which a hydrogen storage vessel containing a metal hydride material can effectively store hydrogen is limited by the purity of the hydrogen being stored. Impurities in the hydrogen stream, such as water vapor or oxygen, greatly increase the deterioration rate of the metal hydride which absorbs and retains hydrogen in the storage vessel. During recharge of a hydride battery system, water vapor is entrained within the hydrogen that is being formed by the reverse electrolytic reaction. The oxygen contained in the water vapor "poisons" the metal hydride, which oxygen deteriorates the metal hydride material used for storing the hydrogen in a hydriding process.

A method of removing oxygen and water impurities from a hydrogen gas stream using a filter system is disclosed in U.S. Pat. No. 4,343,770. The system consists of an adsorbent for filtering out water from a hydrogen stream. The system which is disclosed further includes an elaborate network of piping and valve means for directing hydrogen flow through the filter means and into and out of the hydrogen consuming device, which, in the preferred embodiment, is an internal combustion engine utilizing gaseous hydrogen as the fuel.

Nickel hydride batteries, such as those disclosed in U.S. Pat. Nos. 3,850,964 and 5,047,301, as well as ambient temperature hydride batteries, which are generally available from Eagle Picher Industries of Joplin, Missouri, utilize an electrolyte which must be in a moist condition so as to maintain its conductivity. Great care must be taken with the amount of water available in the cell, as is discussed in U.S. Pat. No. 3,850,964. During battery discharge, the electrolytic reaction breaks down the gaseous hydrogen to form water, thus maintaining cell moisture.

However, during the recharging step, the battery cell produces gaseous hydrogen from the discharge reaction which also contains some evaporated water. Continued recharging of the battery drives out much of the water in the electrolyte and reduces the electrical generating capacity. The water condenses on the elements of the battery cell and maintains the conductivity of the electrolyte, which is necessary for the battery to continue providing electrical power. Thus, some means is necessary to maintain the moisture in the electrolyte by a mechanism which tends to force the water vapor toward the battery side of a separated hydrogen storage vessel/hydride battery cell.

In accordance with the above, there is disclosed a battery system and method of use thereof which utilizes a stream of hydrogen for generating electrical power on demand, comprising a hydrogen storage vessel having at least one opening and a metal hydride bed disposed therein, the metal hydride bed being able to absorb hydrogen under certain conditions and to release hydrogen under other conditions, a battery cell enclosed in an enclosure comprising an electrolyte and an oxidant, the enclosure of the battery cell having at least one opening, in-line piping means having at least two ends, one end being sealingly connected to the hydrogen storage vessel opening and the other end being sealingly connected to the battery cell opening, a predetermined quantity of hydrogen which is disposed within the system, whereby during discharging of the battery cell, the hydrogen is impelled to flow in a stream from the hydrogen storage vessel to the battery cell and during recharging of the battery cell, the hydrogen stream is impelled to flow from the battery cell to the hydrogen storage vessel, a catalytic converter disposed in-line between the battery battery cell and the hydride bend, and a molecular sieve dryer having a water adsorbing material for adsorbing water vapor from the stream of hydrogen during battery recharging and for releasing water as a vapor into the hydrogen stream during battery discharge, the molecular sieve dryer being disposed in line between the catalytic converter and the metal hydride bed.

DETAILED DESCRIPTION OF THE PREFERRED EMBODIMENT

Figure 1:
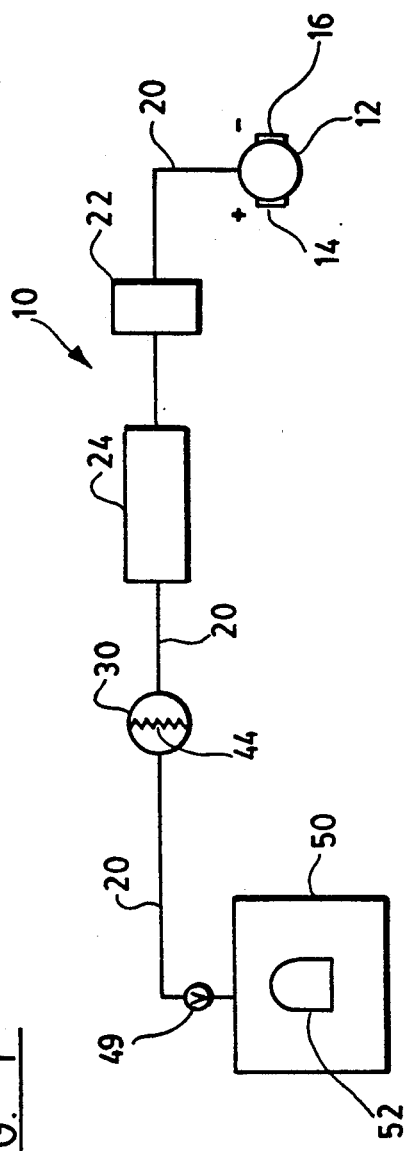
FIG. 1 illustrates a plan view of a device according to the present invention.
Figure 2:
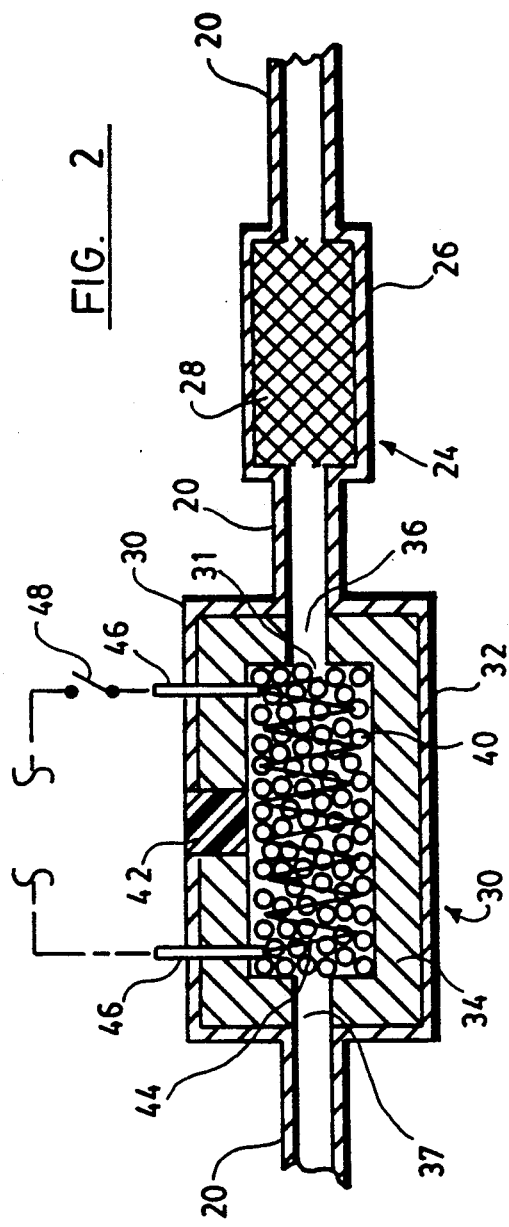
FIG. 2 illustrates a cross-sectional detail view of certain of the elements shown in FIG. 1.

The invention is shown in FIGS. 1 and 2, wherein like elements in each of the FIGURES are referenced by identical reference characters. Referring to FIG. 1, the system 10 of the preferred embodiment comprises a nickel-hydrogen battery cell 12 having a positive electrode 14 and a negative electrode 16. The precise construction of the cell is not overly significant to the invention. The cell 12 may be one that is generally known or may be of special construction. It should be appreciated that the only requirement is that the fuel for the cell is hydrogen, and any metal-hydrogen battery cell may use the teachings of this invention. For example, an exemplary cell could be made in accordance with the teaching of U.S. Pat. No. 4,699,856, the subject matter of which is herein incorporated by reference, where appropriate. Alternatively, the cell may consist of a conventional Ni-KOH cell wherein KOH is used as the electrolyte, as is described in U.S. Pat. No. 3,850,694.

The cell 12 is in fluid communication with other elements of the system through a hermetically sealed piping means 20. The piping means 20 provides fluid communication throughout the complete system, connecting all of the elements in an in-line connection. The in-line connection defined by piping means 20 provides the path for transmission of gas through the system. In the preferred embodiment, the gas being transmitted is hydrogen and the piping means 20 is a singular, but linearly segmented, means for the transmission of the hydrogen.

Between each segment of the piping means 20 are disposed the discrete elements comprising the system. Taking each element in a linear progression starting with the battery cell 12, an optional heat exchanger 24 is provided to cool off the gaseous hydrogen which is being transmitted to the battery cell 12 during a discharge step of the battery system.

The next element in the system, in-line with the piping means 20, is a catalytic converter 24 for converting $O_2$ molecules, in combination with hydrogen from the gaseous stream, into water. Stray oxygen molecules may find their way into the system, even if it is hermetically sealed, as a result of the electrolytic reaction which occurs in the battery cell 12.

A catalytic converter 24 is shown in cross-sectional detail in FIG. 2. Catalytic converter 24 comprises a housing 26, which may be cylindrical, and a catalyst 28 in the form of thin strands of wire. The wire comprise one of several elements known to be good catalysts, such as platinum, palladium and nickel. Exemplary catalytic converters, such as oxygen removing purifiers, may be obtained from Matheson Gas Products Company in East Rutherford, New Jersey.

The catalytic converter 24 is operational only during the recharging step of the battery system, when the gaseous hydrogen is transmitted from the battery cell 12 through the piping means 20 for storage. Referring to FIGS. 1 and 2, during recharging, the hydrogen gas is transmitted from the right toward the left. After passing through the catalytic converter 24, the hydrogen stream should contain only $H_2$ molecules and water vapor, $H_2O$. The hydrogen stream is referred to as being "wet" and next passes through dryer 30, which removes the water vapor from the hydrogen.

An appropriate drying means is illustrated in cross section in FIG. 2 and takes the form of a molecular sieve dryer 30. Such a molecular sieve dryer is commercially available from the Linde Division of Union Carbide Corporation, Somerset, New Jersey. The Linde Model 4A molecular sieve, having a nominal pore diameter of 4A, has been found to work best in removing water from the hydrogen stream.

Referring to FIG. 2, an exemplary molecular sieve dryer 30 comprises a chamber 31 defined by a chamber wall 32 having an internal layer of thermally insulating material 34. The thermal insulation is optional, but assists in avoiding loss of thermal energy during battery discharge. The chamber 31 provides an opening 36 which, during battery recharging, introduces the "wet" hydrogen into the chamber 31, and a second opening 37, at an end opposite to opening 36, for expelling the "dry" hydrogen stream from the chamber 31 after it has passed through the molecular sieve 30. The openings 36,38 are, of course, hermetically sealed to the segments of piping means 20, enclosing and hermetically sealing the chamber 31 within the system 10 together with all of the other elements.

Chamber 31 encloses the operational elements of the molecular mole sieve dryer 30, which elements comprise adsorbent 40 having precisely uniform sizes and dimensions, and which provide numerous minute passageways that permit passage of the $H_2$ molecules but filter out the larger $H_2O$ molecules. The adsorbent 40 is usually a water adsorbing zeolite, of general formula $M_{2/n}O \cdot Al_2O_3 \cdot xSiO_2 \cdot yH_2O$ where M is an appropriate cation of n valance and y is the number of adsorbed water molecules. For the Model 4A molecular sieve, $Na_{12}[(AlO_2)_{12}(SiO_2)_{12}] \cdot 27H_2O$ provides good water adsorbing characteristics.

The adsorbent 40 is a static desiccant and can be packed in chamber 31 in the form of powder, pellets, mesh or beads. The preferred embodiment includes beads with an impregnated saturation indicator mechanism, such as a view port covered by a clear window 42. The window 42 may be made of glass and is sealed to the chamber wall 32.

The indicator comprises a chemical impregnated into the adsorbent 40. The adsorbent is in the form of beads to which the impregnated chemical imparts a blue color when the adsorbent 40 is fully activated by the removal of the water of hydration. When a gas stream is dried during passage through the molecular sieve dryer 30, the blue color will turn pink as water is adsorbed. The pink color indicates the saturation point of the adsorbent 40, and in use with the present invention, denotes when the system 10 is operating properly during recharging of the battery.

During operational discharge of the battery cell 12, the indicating adsorbent 40 will turn from a pinkish to a bluish color. Conversely, during recharging of the battery cell 12, the adsorbent 40 will turn from blue to pink as water is absorbed. The port window 42 should be disposed within the chamber wall 32 to provide a clear and easy view of the indicating adsorbent material 40 when the device is being monitored.

Disposed in a looping pattern within the adsorbent 40 is an electrical resistance heating wire 44, comprising a known material such as nichrome. The electrical heating wire 44 is connected at both of its ends to a power source (not shown) through two electrically insulated leads 46. The power source may be the nickel hydride cell 12 during the discharging step, and the heating wire 44 may consume about 2.5–5.0% of the power of cell 12. The layer of insulating material 34 is important in maintaining the heat provided by wire 44 within the chamber 31. A control switch 48, which may be automatically or manually operated, is provided for introducing or shutting off electrical power to the resistance heating wire 44 when it is needed during the operation of the system 10.

The final segment of the piping means 20 extends to a valve 49 and then to the hydrogen storage container 50, as shown in FIG. 1. The container 50 is a sealed chamber enclosing a porous bed of a metal hydride material 52 having a high capacity for hydrogen storage. The valve 49 may be a manually operated valve or a solenoid valve, and when closed, effectively seals the container 50. Proper use of valve 49 operates to remove the unwanted, self discharge of the metal hydrogen battery cell, which has been a difficulty encountered in the past.

A significant feature of the present invention is providing a dry, oxygen-free hydrogen gas stream, which is obtained after the hydrogen passes through the catalytic converter 24 and the molecular sieve dryer 30. The hydrogen stream, cleaned of impurities, is much less destructive of the metal hydride materials making up the hydride bed 52. As a consequence, it becomes possible to use inexpensive hydride materials which could otherwise not be usable. These hydride materials can supplant the very expensive, exotic, water-impermeable hydride materials in present use with hydride batteries. In the preferred embodiment according to the present invention, the use of $LaNi_5H_x$ hydride material is contemplated.

In the past, application of these types of materials with hydride batteries caused water vapor in the hydrogen gas stream to be absorbed by the hydride bed 52 in storage vessel 50 through a hydrogen/oxygen dissociation mechanism. When the hydrogen was again withdrawn for use during the discharge of battery cell 12, the oxygen atoms remained within the hydride material. Repeated cycles of discharging and recharging of the system eventually saturated the hydride material with oxygen to an extent that the hydride material no longer effectively absorbed hydrogen. Thus, the battery failed and would not function unless the hydride material was replaced by a fresh supply of hydride material. Under normal use parameters, the replacement of the hydride material was necessary after 10–20 cycles. The inventive device described above and illustrated in FIGS. 1 and 2 leads to a vast improvement in the number of cycles that a hydride battery can perform effectively.

In battery operation, a complete cycle of the system 10 both discharges and recharges the battery cell 12. During discharge, battery cell 12 requires a source of electrons which provide electromotive force at the negative electrode 16. The electrolytic reaction which occurs in the battery cell 12 according to known processes requires a source of hydrogen molecules to drive the reaction toward producing the necessary electrons.

The electrolytic reaction is a reversible reaction, that is, the discharge step introduces hydrogen and produces a net result of electricity (electrons) and water as a by-product. The reaction can be driven in the reverse direction during recharging, where an external electric power source introduces electrons which are then used to produce $H_2$ and $OH^-$ radicals from the available water. The reaction is well known for the case of nickel hydrogen, as is documented in technical treatises, such as the "Handbook of Batteries and Fuel Cells," ed. D. Linden, McGraw-Hill Book Co., New York, NY, ch.22, pp.22-2.

Referring again to FIG. 1, hydrogen is introduced into the Ni—KOH battery cell 12 by opening valve 49. Valve 49 may be a solenoid valve which opens automatically when electrical power is needed from the battery. The valve 49 may contain the $H_2$ under some low pressure, approximately 10–20 psi above atmospheric pressure which develops when the battery cell gives off hydrogen gas during the previous recharging step. During battery discharge, the nickel hydride cell 12 consumes hydrogen, and a hydrogen pressure differential develops between the hydrogen storage vessel 50 and the cell 12. This pressure differential tends to force a stream of gaseous hydrogen to flow toward the cell 12.

As the hydrogen in cell 12 is consumed, the hydrogen partial pressure around the hydride bed 52 falls below the equilibrium pressure of the hydride material, and the hydride bed exudes more hydrogen into the vessel 50. It is well known in the hydride field that the equilibrium pressure may be predetermined by different initial parameters so that the hydride continues to give off hydrogen until a majority, approximately 80%, of the capacity of the nickel hydride cell 12 is depleted. Alternatively, heat may be provided to the metal hydride bed 52, which heat is available from an external source as waste heat or even may be generated by the nickel hydride battery cell 12 itself. Heating the hydride bed 52 will release H₂ into the vessel 50 and through the piping means 20 to pass into the resistance-heated molecular sieve dryer 30. The heating of the hydride bed 52 may be used as an emergency fuel supply, such as a reserve amount of power necessary to travel to the next recharging point.

Referring now to FIG. 2, as the hydrogen stream diffuses through the molecular sieve dryer 30, it encounters the water which was deposited on the adsorbent material 40 during a previous discharge step. The water evaporates to a certain extent into the hydrogen stream and is returned to the nickel hydride cell 12

It has been found that during discharge, heating of the chamber 31 by means of the electrical resistance heating wire 44 will evaporate the water more effectively and further activate the adsorbent 40 for water vapor adsorption during the next recharging step. If the adsorbent 40 is of the indicating type, discussed above, the change from a pink to blue color of the adsorbent 40 will be visible through window port 42.

More importantly, the hydrogen stream becomes wet as the hydrogen is returned to the battery cell 12. Return of the water vapor to battery cell 12 provides moisture to the electrolyte in the cell in order to maintain the contact between the cell elements. As explained above, recharging of the battery cell tends to drive out the gaseous hydrogen which results from the reverse electrolytic reaction by developing hydrogen pressure in the battery cell 12. A pressure differential builds up from the hydrogen in the cell 12, and gaseous hydrogen is forced out into the first segment of pipe means 20. However, water vapor which has evaporated into the hydrogen gas stream is also expelled from the battery cell 12. Repeated recharging of the system 10 eventually tends to dry out the electrolyte in cell 12. The cell then fails to provide any electric current because no contact is made by the elements within the cell.

One feature of this invention is that during recharging, the electric heating wire 44 evaporates the residual water in the adsorbent 40 and the water vapor is then deposited within the electrolyte of cell 12. Maintaining the moisture of the cell elements provides a more efficient operation of the cell during discharge and is an improvement over prior art devices.

It should be noted that during the discharge step the catalytic converter 24 is not operating. The hydrogen stream continues to travel through the in-line pipe means 20 to the heat exchanger 22, shown in FIG. 1. The heat exchanger 22 is an optional element which may be used to cool the hydrogen. It has been found that cooling the hydrogen tends to reduce the temperature of the hydrogen stream to ambient temperatures. Cooling the hydrogen stream is desirable for driving the electrolytic reaction in the battery cell 12 during discharge. Entrance of the cool hydrogen into the cell 12 drives the electrolytic reaction which produces a potential across the electrodes 14,16.

A circuit connection to an electrical load across the electrodes 14,16 will then begin the flow of current from the cell 12, which current production continues conversion of the hydrogen to water. The drop in the hydrogen pressure in the cell 12 causes a pressure differential which tends to push more hydrogen from the hydrogen storage vessel 50 into the in-line stream and through the pipe means 20 to the battery cell 12. The reaction proceeds and the hydrogen continues to flow as long as electrical current is consumed by the circuit and load (not shown).

To stop the reaction, the circuit through the electrodes 14,16, which is connected to a load (not shown), can be broken. In that case, the electrolytic reaction proceeds until it reaches an equilibrium. During equilibrium conditions, as much hydrogen is converted to water as is the water which becomes hydrogen. At the equilibrium point of the reaction, the consumption of gaseous hydrogen stops and a hydrogen pressure equilibrium between the cell 12 and the hydrogen storage vessel 50 develops. With a constant pressure, there is also an equilibrium point which develops between the metal hydride bed 52 and the hydrogen in the vessel 50. Thus, all of the various components remain at equilibrium and the system remains static with no hydrogen flow between the elements.

A similar result may be reached by shutting off of the optional valve 49, which will also cut off the hydrogen flow and isolate the two separate reversible reactions, that of the electrolytic reaction in the cell 12 and of the hydrogen desorption reaction from the hydride bed 52 in the vessel 50. One advantage of a shutoff valve 49 is that the operation of system 10 may be stopped immediately in case of emergency, such as if a hydrogen leak develops. Also, as described above, a shutoff valve 49 removes problems which may otherwise develop due to the unwanted self discharge of the battery cell 12.

During the recharging step, the reversible reactions which take place within system 10 are driven in the opposite direction from the discharge step. The recharge step first requires a source of steady electric power. Such a source may be a power grid, such as is generally available. Another possible source is regular stations for recharging batteries which are utilized in an automobile. It is contemplated that an automobile which operates on a large battery made according to the present invention may be able to recharge while on the road at a station which provides a recharging service.

It is also contemplated that the source of electric power may be a solar panel which may provide electric power to a first battery during daylight hours. A photovoltaic system is capable of charging a primary metal hydride battery cell and storing the hydrogen gas evolved from the reverse electrolytic reaction in an identical manner to that of a conventional recharge system. A user may utilize the automobile with a first battery during one day, and an alternate battery may be utilized on a subsequent day while the first battery is recharging.

Referring again to FIG. 1, recharging of the system 10 begins by introducing electrons to the negative electrode 16, in effect making it a positive electrode and thus reversing the electrolytic reaction described above. The reverse reaction results in the conversion of the water, left in the cell 12 as a by-product, into hydrogen and hydroxyl ions (OH−). The hydroxyl ions remain in solution, and are the negatively charged half of the KOH salt which was originally an element of the battery cell.

The hydrogen forms H₂ molecules which collects in cell 12 as a gas. Continued collection of the hydrogen increases the hydrogen gas pressure and impels the hydrogen into the first segment of the piping means 20. The hydrogen gas is not affected by the heat exchanger 22 as it travels in a stream through the heat exchanger 22, because the heat exchanger 22 is not operated during the recharging cycle.

The hydrogen stream continues to flow through the system 10, from right to left in FIGS. 1 and 2, and reaches the catalytic converter 24. The hydrogen stream at this point may include oxygen molecules which can appear in the system as trace impurities from the electrolytic reaction. For example, two OH$^-$ ions may join to obtain $O_2$. These trace amounts of $O_2$ cause deterioration of the metal hydride bed 52 after repeated cycles if the oxygen is permitted to reach the hydride material. Continued use of the system without oxygen removal results in excessive oxygen deterioration of the metal hydride material in bed 52.

The catalytic converter 24 converts all of the 02 molecules by combining with hydrogen from the passing hydrogen stream to form water molecules, $H_2O$. The water evaporates into the $H_2$ stream and is borne along as water vapor within the stream.

The hydrogen in the in-line pipe means 20 is wet before reaching the dryer 30, as is explained above. The molecular sieve dryer 30, in a cool state because the resistance heating wire 44 is not operating, dries out the hydrogen stream, removing the water vapor by adsorbing the water molecules within the zeolite material, as explained above.

The dry hydrogen stream then continues through the pipe means 20 and into the hydrogen storage vessel 50. As the hydrogen builds up pressure in the storage vessel 50, the equilibrium of the hydriding process in the hydride bed 52 is altered. That is, as the pressure builds up, the metal hydride bed absorbs more hydrogen because the hydrogen pressure in the vessel 50 exceeds the equilibrium pressure of the hydriding process. As the hydride bed 52 absorbs the hydrogen, the hydrogen pressure in the vessel 50 becomes lower than the hydrogen pressure in the cell 12, which is continuing to produce $H_2$ molecules as a result of the reverse electrolytic reaction. That difference in the hydrogen pressure develops a pressure differential and results in the stream of hydrogen gas which is transmitted from the cell 12 by the pipe means 20 through the catalytic converter 24 and the dryer 30 into the vessel 50.

The stream of gaseous hydrogen will continue until the battery cell 12 is completely recharged. The completion of the recharge cycle can be sensed and indicated by a known mechanism, such as when the potential or power available in the cell 12 reaches a certain level. When recharging is completed, the electrical power source (not shown) is removed from the battery cell 12, and all elements of the system 10 are allowed to return to equilibrium. As an additional safety feature, the valve 49 may also be shut down, thus isolating the hydrogen stored in bed 52 from the remainder of the system 10.

When the valve 49 is shut, the hydrogen pressure in the vessel 50 reaches in equilibrium pressure with the hydriding process in the bed 52. Under normal conditions, this equilibrium pressure should be at or near the final hydrogen pressure of the system 10 just before valve 49 is closed. Closing of the valve 49 stores the energy in the metal hydride within the system 10.

The hydrogen pressure in the remainder of the system 10 then reaches an equilibrium in the battery cell 12 in accordance with the electrolytic reaction set forth above. It should be noted, however, that the potential across the electrodes 14 and 16 is maintained even though the battery cell 12 does not comprise a part of an electrical circuit. If the battery cell 12 is not immediately utilized, maintaining the potential across the electrodes 14,16 will eventually drain the electrolytic reaction until all of the hydrogen which is available in the cell 12 and pipe means 20 is dissipated. Proper design of the system 10 will minimize the volume of hydrogen available in this space. When the gaseous hydrogen is completely dissipated in the electrolytic reaction, the hydrogen pressure in the cell 12 falls to a level at or near atmospheric pressure but, in any case, less than the hydrogen pressure in the hydrogen storage vessel 50. The system 10 is now ready for use.

It should be noted that during the period when the hydrogen is stored in vessel 50, the battery cell 12 is not in operation and there is no potential across the electrodes 14,16. The unique construction of this battery system 10 thus increases the sheft life of the battery cell 12 for an indefinite amount of time, and the system 10 remains as ready for use months or years after it has been charged as it is immediately after it has been recharged. Moreover, the inventive system may undergo a much greater number of cycles because the hydride bed 52 is protected from oxygen which destroys the ability of the metal hydride material to retain and store large amounts of hydrogen.

A full appreciation of the invention can lead one skilled in the art to modification or adaptation of the invention following the general principle of an in-line, segmented, hydride battery/hydrogen storage vessel in which the hydrogen stream is purified of oxygen atoms. For example, one possible modification may be to dispose the catalytic converter 24 and the molecular sieve dryer 30 within a chamber which also encloses the nickelhydrogen cell 12. Such an integral system may be appropriate for mass production of the system 10 in a design which permits the system 10 to be easily disposed in an electric automobile. For example, the hydrogen storage vessel 50 may be removably connected to the pipe means 20. When the hydride bed 52 deteriorates to a nonoperational condition, a new vessel 50 may be exchanged for the old one.

Alternatively, the catalytic converter 24, and molecular sieve 30 may be disposed in a chamber (not shown) within vessel 50 which is isolated from the hydride bed 52. This type of integral storage vessel 50 may be removed and replaced by a new one, while the hydride bed 52, the molecular sieve dryer 30 and the catalytic converter 24 are all reconditioned for recycled use.

The invention has been described in connection with a preferred form of the invention. It will be understood that any modification may be made thereto while retaining the general scope of the invention, which is only limited by the elements recited in the following claims and their equivalents.

What is claimed is:

1. A battery system utilizing a stream of hydrogen for generating electrical power on demand, comprising:
    a hydrogen storage vessel having at least one opening and a metal hydride bed disposed therein, the metal hydride bed being able to absorb hydrogen under certain conditions and to release hydrogen under other conditions;
    at least one battery cell enclosed within a vessel, each said battery cell comprising an electrolyte and an oxidant, the enclosure of the battery cell having at least one opening;
    in-line piping means having at least two ends, one end being sealingly connected to said hydrogen storage vessel opening and the other end being sealingly connected to the battery cell opening;

a predetermined quantity of hydrogen which is disposed within said system, whereby during discharging of the battery cell, the hydrogen is impelled to flow in a stream from said hydrogen storage vessel to said battery cell and during recharging of the battery cell, the hydrogen stream is impelled to flow from said battery cell to said hydrogen storage vessel;

a catalytic converter disposed in line between the battery cell and the hydride bed; and a molecular sieve dryer having a water adsorbing material for adsorbing water vapor from the stream of hydrogen during battery recharging and for releasing water as a vapor into the hydrogen stream during battery discharge, the molecular sieve dryer being disposed in line between said catalytic converter and said metal hydride bed.

2. The battery system according to claim 1 wherein said molecular sieve dryer further comprises zeolite beads as a water adsorbing material.

3. The battery system according to claim 1 wherein said molecular sieve dryer further comprises a resistance heating wire disposed within said water adsorbing material, said wire for heating said water adsorbing material when an electrical current is passed through said wire for evaporating water which is adsorbed in said water adsorbing material, whereby the water is released into the hydrogen stream during discharge of the battery.

4. The battery system according to claim 1 wherein a valve is disposed in-line in the piping means for shutting off the stream of hydrogen.

5. The battery system according to claim 1 wherein said molecular sieve dryer further comprises a sealed view port affording a view of said adsorbent material, said adsorbent material including an impregnated indicating chemical which causes the adsorbent material to indicate a condition of water saturation.

6. The battery system according to claim 1 wherein said hydrogen storage vessel includes a means for heating said metal hydride bed and for selectively raising the temperature of said bed whereby release of a reserve amount of hydrogen is obtained.

7. A method of repeatedly utilizing a stream of hydrogen for generating electrical power on demand, the method comprising the steps of:

a) providing a sealed hydrogen system including a segmented metal-hydrogen battery cell, a catalytic converter, a molecular sieve dryer, a metal hydride storage vessel and in-line piping means between at least the metal hydride storage vessel and a container for the metal-hydrogen cell, the catalytic converter and the molecular sieve dryer both being disposed between the metal hydride bed, contained in said storage vessel, and the battery cell, in said container;

b) selectively releasing hydrogen gas from said hydride bed and piping said hydrogen gas through said in-line piping means, said catalytic converter and said molecular sieve dryer to said battery cell;

c) utilizing electrical power emanating from said battery cell, said battery cell producing electrical power by consuming said hydrogen gas;

d) recharging the battery cell by providing an external source of electrical power to said battery cell, whereby recharging of the battery cell forms hydrogen gas;

e) piping said hydrogen gas through said catalytic converter and thereby catalytically converting any oxygen impurities into water;

f) piping said hydrogen gas through said molecular sieve dryer, thereby removing any water vapor from said hydrogen gas;

g) piping said hydrogen gas to said metal hydride bed and storing said hydrogen gas in said metal hydride bed; and h) repeating steps a)–g) as desired.

8. The method according to claim 7, above, wherein step b) further comprises heating an adsorbent material in said molecular sieve dryer, thereby releasing water vapor into the hydrogen gas being piped therethrough.

* * * * *